United States Patent
Flanary et al.

(10) Patent No.: US 8,164,293 B2
(45) Date of Patent: Apr. 24, 2012

(54) METHOD OF CONTROLLING A MOTOR

(75) Inventors: Ron Flanary, Blacksburg, VA (US);
Martin Piedl, Radford, VA (US);
Charles Ford, Blacksburg, VA (US);
Troy Anderson, Blacksburg, VA (US)

(73) Assignee: Hoffman Enclosures, Inc., Anoka, MN (US)

( * ) Notice: Subject to any disclaimer, the term of this patent is extended or adjusted under 35 U.S.C. 154(b) by 403 days.

(21) Appl. No.: 12/555,677

(22) Filed: Sep. 8, 2009

(65) Prior Publication Data
US 2011/0057595 A1 Mar. 10, 2011

(51) Int. Cl.
*G05D 23/19* (2006.01)
*H02P 7/00* (2006.01)
(52) U.S. Cl. .................. 318/471; 318/444
(58) Field of Classification Search .......... 318/432–434, 318/438, 443, 444, 471–473
See application file for complete search history.

(56) References Cited

U.S. PATENT DOCUMENTS

| | | |
|---|---|---|
| 1,334,461 A | 3/1920 | Kerr |
| 2,517,477 A | 8/1950 | Griffin |
| 2,601,899 A | 7/1952 | Boemer |
| 2,625,106 A | 1/1953 | Hoffman |
| 2,659,313 A | 11/1953 | Carson |
| 2,869,471 A | 1/1959 | Copeland |
| 3,213,800 A | 10/1965 | McAlvay et al. |
| 3,354,529 A | 11/1967 | James |
| 3,485,178 A | 12/1969 | Dutton et al. |
| 3,500,158 A | 3/1970 | Landau et al. |
| 3,611,081 A | 10/1971 | Watson |
| 3,687,151 A | 8/1972 | Krause et al. |
| 3,713,749 A | 1/1973 | Fitch |
| 3,776,659 A | 12/1973 | Coon, Jr. |
| 3,786,869 A | 1/1974 | McLoughlin |
| 3,796,507 A | 3/1974 | Smykal et al. |
| 3,812,409 A | 5/1974 | Dinger |
| 3,855,509 A | 12/1974 | Wright |
| 3,904,943 A | 9/1975 | Klang |
| 3,955,130 A | 5/1976 | Graf |
| 3,965,407 A | 6/1976 | Stoner |
| 3,974,357 A | 8/1976 | Saito et al. |
| 4,023,083 A | 5/1977 | Plunkett |

(Continued)

FOREIGN PATENT DOCUMENTS
EP 0638333 2/1995
(Continued)

*Primary Examiner* — Bentsu Ro
(74) *Attorney, Agent, or Firm* — Quarles & Brady LLP

(57) ABSTRACT

Embodiments of the invention provide methods of controlling a motor, such as a servo motor. One method can include monitoring a current temperature of the motor and a power stage of the motor substantially continuously and substantially in real-time. This method can include determining optimum settings for a first time interval to remove power and the second time interval to provide power in order to deliver maximum output while remaining below the maximum rated temperature of the motor. One method can include pulsing power to the motor for a second time interval after a first time interval has elapsed and tailoring pulse shapes of the power provided to the motor for the second time interval. One method can include calculating a maximum phase current based on the rotor shaft torque for each real-time speed of the motor that correlates to the maximum allowable current draw from the power supply.

16 Claims, 6 Drawing Sheets

U.S. PATENT DOCUMENTS

| | | | |
|---|---|---|---|
| 4,037,664 A | 7/1977 | Gibson | |
| 4,064,891 A | 12/1977 | Eberhardt | |
| 4,078,189 A | 3/1978 | Nash et al. | |
| 4,078,191 A | 3/1978 | Morters et al. | |
| 4,180,768 A | 12/1979 | Ferraro | |
| 4,189,005 A | 2/1980 | McLoughlin | |
| 4,208,621 A | 6/1980 | Hipkins et al. | |
| 4,234,007 A | 11/1980 | Titone et al. | |
| 4,240,020 A | 12/1980 | Okuyama et al. | |
| 4,243,927 A | 1/1981 | D'Atre | |
| 4,246,969 A | 1/1981 | McLoughlin et al. | |
| 4,296,367 A | 10/1981 | Hirata | |
| 4,302,711 A | 11/1981 | Morser et al. | |
| 4,324,294 A | 4/1982 | McLoughlin et al. | |
| 4,355,274 A | 10/1982 | Bourbeau | |
| 4,358,726 A | 11/1982 | Iwakane et al. | |
| 4,387,329 A | 6/1983 | Harlow | |
| 4,447,771 A | 5/1984 | Whited | |
| 4,448,256 A | 5/1984 | Eberhardt et al. | |
| 4,474,680 A | 10/1984 | Kroll | |
| 4,499,413 A | 2/1985 | Izosimov et al. | |
| 4,503,377 A | 3/1985 | Kitabayashi et al. | |
| 4,526,234 A | 7/1985 | Little | |
| 4,554,939 A | 11/1985 | Kern et al. | |
| 4,599,550 A | 7/1986 | Robertson, Jr. et al. | |
| 4,608,527 A | 8/1986 | Glennon et al. | |
| 4,651,068 A | 3/1987 | Meshkat-Razavi | |
| 4,678,404 A | 7/1987 | Lorett et al. | |
| 4,712,050 A | 12/1987 | Nagasawa et al. | |
| 4,724,373 A | 2/1988 | Lipo | |
| 4,735,225 A | 4/1988 | Huveteau | |
| 4,743,818 A * | 5/1988 | Quayle et al. | 318/473 |
| 4,768,923 A | 9/1988 | Baker | |
| 4,802,818 A | 2/1989 | Wiggins et al. | |
| 4,830,589 A | 5/1989 | Pareja | |
| 4,899,825 A | 2/1990 | Bosoni et al. | |
| 4,913,619 A | 4/1990 | Haentjens et al. | |
| 4,914,396 A | 4/1990 | Berthiaume | |
| 4,924,166 A | 5/1990 | Roussel | |
| 4,924,168 A | 5/1990 | Horie et al. | |
| 4,925,367 A | 5/1990 | Paliwoda et al. | |
| 4,942,344 A | 7/1990 | Devitt et al. | |
| 4,955,790 A | 9/1990 | Nakanishi et al. | |
| 4,968,925 A | 11/1990 | DeDoncker | |
| 4,993,495 A | 2/1991 | Burchert | |
| 5,009,244 A | 4/1991 | Grindley et al. | |
| 5,054,650 A | 10/1991 | Price | |
| 5,092,740 A | 3/1992 | Yamamura | |
| 5,105,143 A | 4/1992 | Marumoto et al. | |
| 5,118,008 A | 6/1992 | Williams | |
| 5,162,727 A | 11/1992 | Hindsberg et al. | |
| 5,166,593 A | 11/1992 | DeDoncker et al. | |
| 5,172,038 A | 12/1992 | Page et al. | |
| 5,174,383 A | 12/1992 | Haugen et al. | |
| 5,232,052 A | 8/1993 | Arvidson et al. | |
| 5,284,174 A | 2/1994 | Norman | |
| 5,313,548 A | 5/1994 | Arvidson et al. | |
| 5,332,954 A | 7/1994 | Lankin | |
| 5,334,923 A | 8/1994 | Lorenz et al. | |
| 5,335,734 A | 8/1994 | Scott et al. | |
| 5,344,515 A | 9/1994 | Chenock, Jr. | |
| 5,373,205 A | 12/1994 | Busick et al. | |
| 5,382,890 A | 1/1995 | Moh et al. | |
| 5,418,440 A | 5/1995 | Sakaguchi et al. | |
| RE35,010 E | 8/1995 | Price | |
| 5,442,268 A | 8/1995 | Goodarzi et al. | |
| 5,442,539 A | 8/1995 | Cuk et al. | |
| 5,467,004 A | 11/1995 | Matsuo et al. | |
| 5,476,015 A | 12/1995 | Valent | |
| 5,481,168 A | 1/1996 | Mutoh et al. | |
| 5,494,112 A | 2/1996 | Arvidson et al. | |
| 5,525,881 A | 6/1996 | Desrus | |
| 5,532,570 A | 7/1996 | Tajima et al. | |
| 5,540,192 A | 7/1996 | Xanders | |
| 5,558,249 A | 9/1996 | Falcoff | |
| RE35,362 E | 10/1996 | Arvidson et al. | |
| 5,616,869 A | 4/1997 | Valent | |
| 5,640,059 A | 6/1997 | Kammiller et al. | |
| 5,648,887 A | 7/1997 | Herndon et al. | |
| 5,704,767 A | 1/1998 | Johnson | |
| 5,710,500 A | 1/1998 | Matsuo et al. | |
| 5,727,933 A | 3/1998 | Laskaris et al. | |
| 5,764,463 A | 6/1998 | Arvidson et al. | |
| 5,765,644 A | 6/1998 | Arvidson et al. | |
| 5,777,447 A | 7/1998 | Okano | |
| 5,796,236 A | 8/1998 | Royak | |
| 5,803,596 A | 9/1998 | Stephens | |
| 5,811,957 A | 9/1998 | Bose et al. | |
| 5,816,328 A | 10/1998 | Mason et al. | |
| 5,823,219 A | 10/1998 | Purvis et al. | |
| 5,869,946 A | 2/1999 | Carobolante | |
| 5,881,818 A | 3/1999 | Lee et al. | |
| 5,909,775 A | 6/1999 | Grindley | |
| 5,923,135 A | 7/1999 | Takeda | |
| 5,923,141 A | 7/1999 | McHugh | |
| 5,936,377 A | 8/1999 | Blaschke et al. | |
| 5,952,803 A * | 9/1999 | Canada et al. | 318/558 |
| 5,971,704 A | 10/1999 | Blattmann | |
| 5,973,474 A | 10/1999 | Yamamoto | |
| 5,979,564 A | 11/1999 | Crabtree | |
| 5,995,710 A | 11/1999 | Holling et al. | |
| 6,008,589 A | 12/1999 | Deng et al. | |
| 6,009,953 A | 1/2000 | Laskaris et al. | |
| 6,013,999 A | 1/2000 | Howard et al. | |
| 6,014,006 A | 1/2000 | Stuntz et al. | |
| 6,016,042 A | 1/2000 | Miura et al. | |
| 6,020,702 A * | 2/2000 | Farr | 318/434 |
| 6,055,359 A | 4/2000 | Gillett | |
| 6,084,376 A | 7/2000 | Piedl et al. | |
| 6,111,379 A | 8/2000 | Feldtkeller | |
| 6,170,241 B1 | 1/2001 | Shibiliski et al. | |
| 6,183,562 B1 | 2/2001 | Pierce et al. | |
| 6,194,852 B1 | 2/2001 | Lovatt et al. | |
| 6,201,417 B1 | 3/2001 | Blum et al. | |
| 6,205,010 B1 | 3/2001 | Ohsaka et al. | |
| 6,294,888 B1 * | 9/2001 | Becker | 318/471 |
| RE37,589 E | 3/2002 | Mueller | |
| 6,552,889 B1 | 4/2003 | Huang et al. | |
| 6,577,089 B1 | 6/2003 | Piedl et al. | |
| 6,599,086 B2 | 7/2003 | Soja et al. | |
| 6,674,248 B2 | 1/2004 | Newman, Jr. et al. | |
| 6,674,260 B1 | 1/2004 | Harriman et al. | |
| 6,683,428 B2 | 1/2004 | Pavlov et al. | |
| 6,684,959 B1 | 2/2004 | Juidici et al. | |
| 6,703,809 B2 | 3/2004 | Royak et al. | |
| 6,710,505 B1 | 3/2004 | Barani et al. | |
| 6,725,940 B1 | 4/2004 | Klein et al. | |
| 6,747,300 B2 | 6/2004 | Nadd et al. | |
| 6,763,804 B2 | 7/2004 | Pursifull | |
| 6,766,863 B2 | 7/2004 | Arvidson et al. | |
| 6,831,429 B2 | 12/2004 | Fu | |
| 6,844,705 B2 | 1/2005 | Lai et al. | |
| 6,863,502 B2 | 3/2005 | Bishop et al. | |
| 6,870,348 B2 | 3/2005 | Mijalkovic et al. | |
| 6,886,639 B2 | 5/2005 | Arvidson et al. | |
| 6,917,184 B2 | 7/2005 | Lai et al. | |
| 6,979,181 B1 | 12/2005 | Kidd | |
| 6,982,533 B2 | 1/2006 | Seibel et al. | |
| 6,998,820 B2 | 2/2006 | Lai et al. | |
| 7,037,069 B2 | 5/2006 | Arnold et al. | |
| 7,095,209 B2 | 8/2006 | Thunes et al. | |
| 7,106,130 B2 | 9/2006 | Gan et al. | |
| 7,141,954 B2 | 11/2006 | Lai et al. | |
| 7,193,385 B2 | 3/2007 | Emadi et al. | |
| 7,248,009 B1 | 7/2007 | Sundquist | |
| 7,304,447 B2 | 12/2007 | Hirai et al. | |
| 7,318,422 B2 | 1/2008 | Douyama et al. | |
| 7,318,483 B2 | 1/2008 | Arvidson et al. | |
| 7,336,464 B1 | 2/2008 | Potanin et al. | |
| 7,337,857 B2 | 3/2008 | Vonhof et al. | |
| 7,387,348 B2 | 6/2008 | Archer et al. | |
| 7,544,041 B2 | 6/2009 | Mayleben et al. | |
| 2003/0020436 A1 | 1/2003 | Coles et al. | |
| 2004/0050556 A1 | 3/2004 | Baker et al. | |
| 2004/0081381 A1 | 4/2004 | Bureaugard et al. | |
| 2004/0232872 A1 | 11/2004 | Sunaga et al. | |
| 2005/0024001 A1 | 2/2005 | Donnely et al. | |

| | | | | | |
|---|---|---|---|---|---|
| 2005/0045345 A1 | 3/2005 | Arvidson et al. | 2008/0173358 A1 | 7/2008 | Guldi |
| 2005/0222287 A1 | 10/2005 | Roberts | 2008/0224639 A1 | 9/2008 | Balsiger |
| 2005/0264972 A1 | 12/2005 | Boulesteix et al. | 2008/0232988 A1 | 9/2008 | Schaupp |
| 2005/0281681 A1 | 12/2005 | Anderson et al. | 2008/0236846 A1 | 10/2008 | Gamble et al. |
| 2006/0176059 A1 | 8/2006 | Mir et al. | 2009/0058302 A1 | 3/2009 | Nerone |
| 2006/0255751 A1 | 11/2006 | Chitta et al. | 2009/0309531 A1 | 12/2009 | Hamahata |
| 2006/0275162 A1 | 12/2006 | Mayleben et al. | 2009/0322272 A1* | 12/2009 | Ozawa et al. ............ 318/473 |
| 2007/0246230 A1 | 10/2007 | Roberts | | | |
| 2007/0247091 A1 | 10/2007 | Maiocchi | | | |
| 2008/0035201 A1 | 2/2008 | Roberts | | | |
| 2008/0131289 A1 | 6/2008 | Koehl | | | |
| 2008/0167769 A1 | 7/2008 | Loudot et al. | | | |

FOREIGN PATENT DOCUMENTS

WO  WO94/26353  11/1994

* cited by examiner

METHOD OF CONTROLLING A MOTOR

BACKGROUND

Electric motors driving a load typically draw a current in relation to the load. The electric motors must be rated for the highest expected peak current. Thus, the maximum peak current dictates the dimensioning of the cables and wires. Additional electronic equipment of the electric motors must also be rated for the maximum peak current.

Electric motors generate heat which can be correlated to current draw. Typically, electric motors include heat sinks in order to help prevent overheating. When electric motors stalls due to an unexpected high load, a detrimental peak current may be drawn which can damage electronic equipment and/or the electric motor itself.

SUMMARY

Some embodiments of the invention provide a method of controlling a motor. The method can include monitoring a current temperature of the motor and a power stage of the motor substantially continuously and substantially in real-time. The method can include determining whether the current temperature of the motor approaches a maximum rated temperature of the motor and removing power from the motor for a first time interval. The method can include supplying power to the motor for a second time interval after the first time interval has elapsed. The method can include determining that the current temperature of the motor is decreasing and decreasing the first time interval and/or increasing the second time interval until the current temperature starts increasing. The method can also include determining that the current temperature of the motor is increasing and increasing the first time interval and/or decreasing the second time interval until the current temperature starts decreasing. In addition, the method can include determining optimum settings for the first time interval and the second time interval in order to deliver maximum output while remaining below the maximum rated temperature of the motor.

Embodiments of the invention provide a method including monitoring a current temperature of the motor and a power stage of the motor substantially continuously and substantially in real-time. The method can include determining whether the current temperature approaches a maximum rated temperature of the motor and removing power from the motor for a first time interval. The method can include pulsing power to the motor for a second time interval after the first time interval has elapsed and tailoring pulse shapes of the power provided to the motor for the second time interval.

Some embodiments of the invention, provide a method including determining a maximum allowable current draw allowed from the power supply. The method can include monitoring a real-time speed of the motor substantially continuously and monitoring a rotor shaft torque of the motor substantially continuously. The method can include calculating a maximum phase current based on the rotor shaft torque for each real-time speed of the motor that correlates to the maximum allowable current draw from the power supply.

DETAILED DESCRIPTION

Figure 1A:
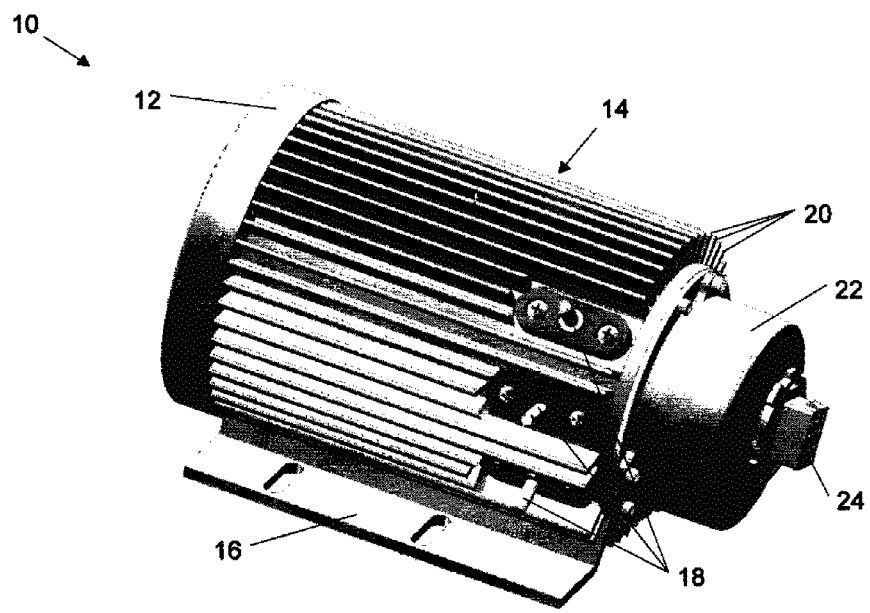
FIG. 1A is a perspective view of a servo motor according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1A illustrates a perspective view of a servo motor 10 according to one embodiment of the invention. The servo motor 10 can include a housing 12, a heat sink 14, a stand 16, and connectors 18. The heat sink 14 can include ribs 20, which can be positioned around a perimeter of the housing 12. The stand 16 can be used to securely mount the servo motor 10 in a suitable location. The connectors 18 can be used to supply power to the servo motor 10. In some embodiments, a controller 22 can be housed within the servo motor 10. In other embodiments, the controller 22 can be coupled to the housing 12 of the servo motor 10. The controller 22 can include a connector 24, which can enable the controller 22 to connect to additional electronic equipment. In some embodiments, the connector 24 can be used to supply power to the controller 22.

Figure 1B:
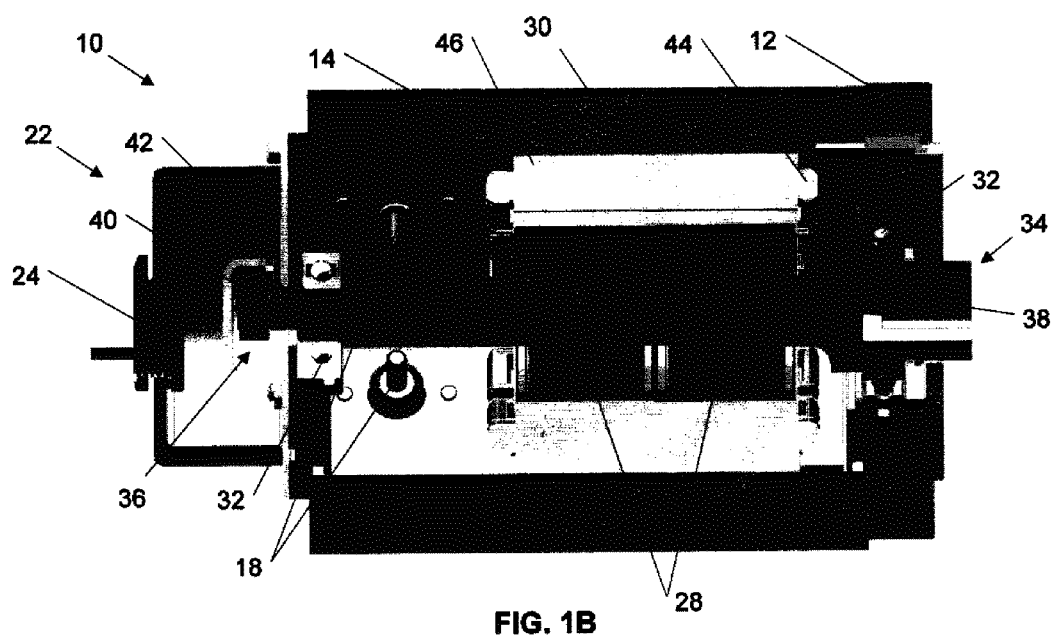
FIG. 1B is a cross-sectional view of the servo motor of FIG. 1A.

FIG. 1B illustrates a cross-sectional view of the servo motor 10 according to one embodiment of the invention. The servo motor 10 can include a rotor shaft 26, one or more rotors 28, and a stator 30. The rotor shaft 26 can be coupled to the housing 12 with one or more bearings 32 enabling the rotor shaft 26 to rotate with respect to the housing 12. The rotor shaft 26 can include a first end 34 and a second end 36. The first end 34 can include a coupling 38, which can enable the servo motor 10 to connect to peripherals, such as, for example, pumps. The second end 36 can extend beyond the housing 12. In some embodiments, the second end 36 can extend into the controller 22. The second end 36 can include projections 40. A sensor 42 can be positioned adjacent to the second end 36. The sensor 42 can include an encoder and/or a resolver. The sensor 42 can measure a rotor shaft speed and/or a rotor shaft angle, such as disclosed in U.S. Pat. Nos. 6,084,376 and 6,525,502 issued to Piedl et al., the entire contents of which are herein incorporated by reference.

In some embodiments, the rotor 28 can be a permanent-magnet rotor. The rotor 28 can be positioned inside the stator 30. The stator 30 can include a stator core 44 and stator windings 46. In some embodiments, the rotor 28 can rotate to drive the rotor shaft 26, while the stator core 44 and the stator windings 46 can remain stationary. The connectors 18 can extend into the housing 12 toward the rotor shaft 26. The connectors 18 can be coupled to the stator 30.

In some embodiments, the sensor 42 can be built into the motor housing 12 to accurately indicate the position and/or speed of the rotor shaft 26. In other embodiments, the sensor 42 can be included in the controller 22. In some embodiments, the speed of the rotor shaft 26 of the servo motor 10 can be substantially continually monitored via a feedback device, such as an encoder, resolver, hall effect sensors, etc. In other embodiments, the speed of the rotor shaft 26 of the servo motor 10 can be measured without a physical sensor (e.g., by extracting information from a position of the rotor shaft 26).

The term "servo motor" generally refers to a motor having one or more of the following characteristics: a motor capable of operating at a large range of speeds without over-heating, a motor capable of operating at substantially zero speed and retaining enough torque to hold a load in position, and/or a motor capable of operating at very low speeds for long periods of time without over-heating. The term "torque" can be defined as the measured ability of the rotor shaft to overcome turning resistance. Servo motors can also be referred to as permanent-magnet synchronous motors, permanent-field synchronous motors, or brushless electronic commutated motors.

The servo motor 10 can be capable of precise torque control. The output torque of the servo motor 10 can be highly responsive and substantially independent of a position of the rotor 28 and a speed of the rotor shaft 26 across substantially the entire operating speed range. In some embodiments, a current draw of the servo motor 10 can be sent to the controller 22 and can be used to compute the torque necessary to drive the servo motor 10.

A conventional DC electric motor can rely on pulse width modulation (PWM) control for operating a peripheral at low rotations per minute (RPM). Especially when the peripheral includes moving a high load, PWM control of a conventional DC electric motor can compromise accurate speed control in order to prevent a stall condition. The use of the servo motor 10 can simplify the actuation and operation of the peripheral. As a result, the servo motor 10 can enable a smooth operation of the peripheral. In some embodiments, the use of the servo motor 10 can allow a smooth operation of the peripheral even at low RPM, which can result in an optimized speed control. In some embodiments, the servo motor 10 can help decrease mechanical wear of the peripheral.

Figure 2:
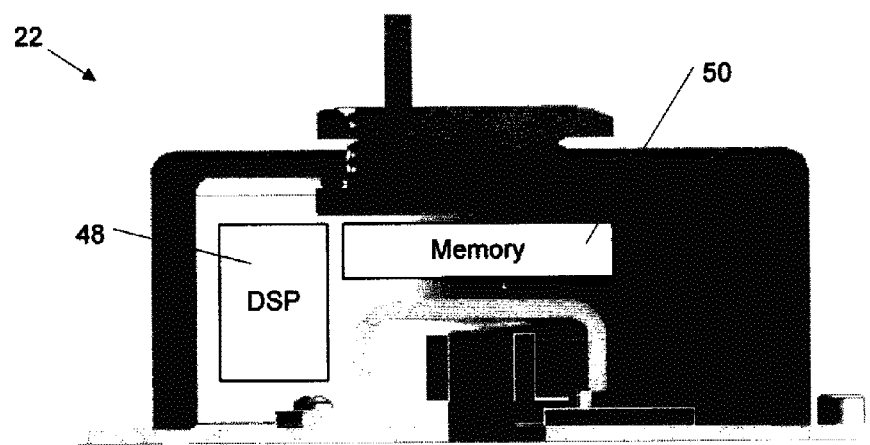
FIG. 2 is a schematic diagram of a controller for use with the servo motor according to one embodiment of the invention.

The controller 22 can be external to the servo motor 10 or housed inside the servo motor 10. As shown in FIG. 2, the controller 22 can include a digital signal processor (DSP) 48, and memory 50. The memory 50 can include random access memory (RAM), read only memory (ROM), and/or electrically erasable programmable read only memory (EEPROM). In some embodiments, the controller 22 can include an analog/digital (A/D) converter and/or a digital/analog (D/A) converter in order to process different input signals and/or to interface with other devices and/or peripherals. In some embodiments, the DSP 48 and/or the memory 50 can be positioned inside or near the servo motor 10 while in other embodiments, the DSP 48 and/or the memory 50 can be housed separately and positioned some distance away from the servo motor 10. In some embodiments, space restrictions and/or thermal loads generated by the servo motor 10 can dictate a position of the controller 22.

Figure 3:
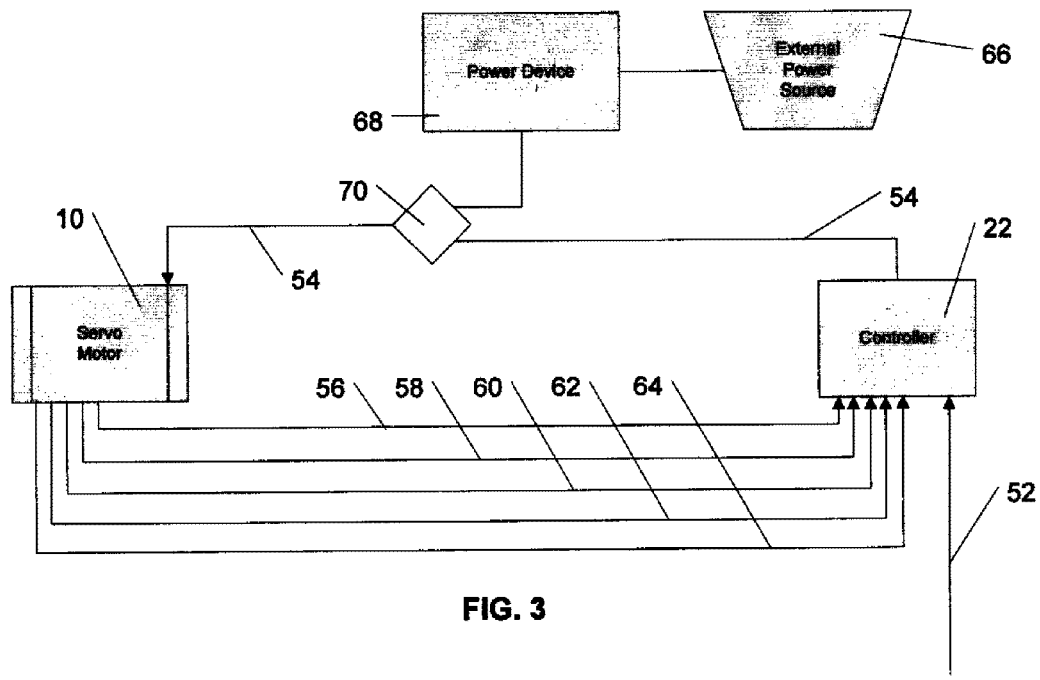
FIG. 3 is a schematic block diagram illustrating connections between the servo motor, additional electrical components, and electronic equipment according to some embodiments of the invention.

FIG. 3 is a schematic block diagram illustrating connections between the servo motor 10, electrical components, and/or electronic equipment according to one embodiment of the invention. On a line 52, the controller 22 can receive an external command to operate the servo motor 10. In some embodiments, the external command can be indicative of a base speed at which the servo motor 10 should be operated. If the servo motor 10 is not running, the external command can be transmitted directly to the servo motor 10 over a line 54. Once the servo motor 10 is running, the DSP 48 can process one or more of the following signals from the servo motor 10: the speed of the rotor shaft 26 (line 56), the angle of the rotor shaft 26 (line 58), the current draw of the servo motor 10 (line 60), and a temperature of the servo motor 10 (line 62). Any suitable combination of these signals or additional signals can be used by the DSP 48 to modify and/or override the external command to provide closed-loop control.

In some embodiments, the actual speed of the rotor shaft 26 of the servo motor 10 can be transmitted back to the DSP 48 via the line 54. In some embodiments, the DSP 48 can use a difference between the base speed and the actual speed of the rotor shaft 26 to modify the operation of the servo motor 10. In some embodiments, the controller 22 can use one or more of the speed of the rotor shaft 26, the torque of the rotor shaft 26, and the position of the rotor shaft 26 to operate the servo motor 10.

In some embodiments, the controller 22 can provide drive diagnostics for the servo motor 10, which can be downloaded for further processing. A technician can use the drive diagnostics to analyze any errors of the servo motor 10 and/or the controller 22. The drive diagnostics can include error messages specifically for the servo motor 10. In some embodiments, the servo motor 10 can communicate the following types of errors to the controller 22: one or more components of the servo motor 10 exceed threshold temperatures, the servo motor 10 requires a higher current for the operation than a threshold current (which can be referred to as "current fold back"), and the servo motor 10 is experiencing a stall condition. If an error is communicated from the servo motor 10 to the DSP 48 via a line 64, the controller 22 can stop the servo motor 10. In some embodiments, the controller 22 can be capable of detecting an interrupted connection between electrical components and/or electronic equipment and can generate an error.

In some embodiments, the rapid compute time of the controller 22 can allow for several evaluations and/or modifications of the external command per rotation of the rotor shaft 26. This can result in rapid adjustments to varying parameters and/or conditions of the servo motor 10 and/or the peripheral, while helping to provide a substantially uninterrupted and smooth operation of the servo motor 10.

As shown in FIG. 3, the servo motor 10 can be powered by an external power source 66. The external command can be sent from the DSP 48 via the line 54 to a power device 68, which can be connected to the external power source 66. Depending on the external command received from the DSP 48, the power device 68 can provide the appropriate power (e.g., the appropriate current draw) to the servo motor 10. In some embodiments, the power device 68 can supply the servo motor 10, the controller 22, and additional electrical components and/or electronic equipment with power. In some embodiments, the power device 68 can be integrated with the controller 22.

In some embodiments, a load dump protection circuit 70 can be used to operate the servo motor 10. In some embodiments, the load dump protection circuit 70 can be part of the power device 68. The load dump protection circuit 70 can prevent an over-voltage peak from causing damage to the servo motor 10, the controller 22, and other electrical components and/or electronic equipment. In some embodiments, the load dump protection circuit 70 can protect at least part of the electrical components and/or electronic equipment from an under-voltage condition and/or a wrong polarity of the external power source 66. In some embodiments, the load dump protection circuit 70 can disconnect the electrical components and/or electronic equipment, if the voltage of the external power source 66 is negative, below a minimum, or above a specified level.

Figure 4:
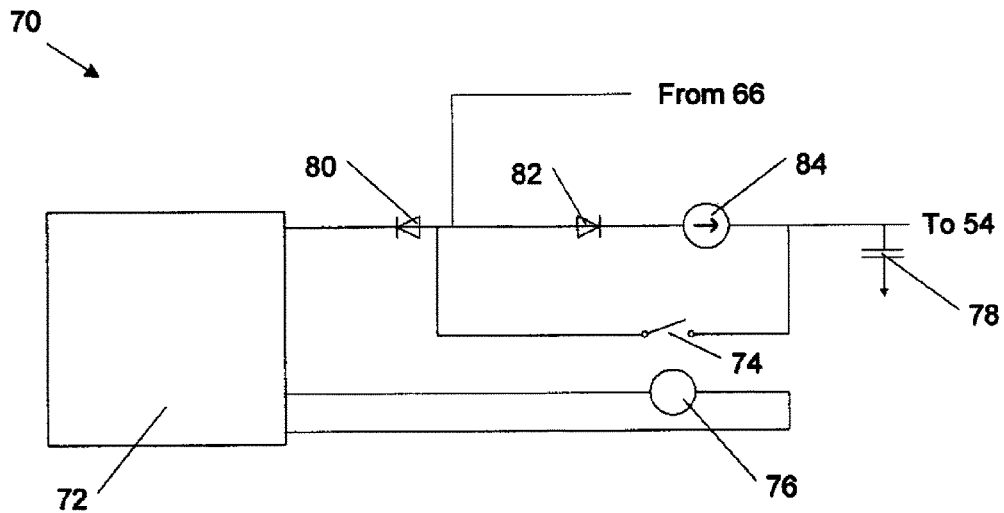
FIG. 4 is a schematic block diagram of a load dump protection system according to one embodiment of the invention.

FIG. 4 illustrates the load dump protection circuit 70 according to one embodiment of the invention. The load dump protection 70 can include a sensing circuit 72, a relay contact 74, a relay coil 76, a capacitor 78, a first diode 80, a second diode 82, and a current source 84. The relay coil 76 can be connected to the sensing circuit 72. The relay coil 76 can energize and de-energize the relay contact 74. Before the relay contact 74 closes, the current source 84 can charge the capacitor 78 with a limited current to enable a "soft start." Once the capacitor 78 is charged to the correct level, the current source 84 and the second diode 82 can be bypassed by the relay contact 74 enabling the high currents of normal operation to flow.

The first diode 80 and the second diode 82 can prevent damage to the sensing circuit 72 and/or other electronic equipment, if the voltage supplied from the external power supply 66 has the wrong polarity. For example, if the external power supply 66 is a battery, which is being disconnected for maintenance and/or repair procedures, the first diode 80 and the second diode 82 can prevent damage to the electronic equipment, if the battery is re-connected incorrectly.

In some embodiments, the sensing circuit 72 can withstand an over-voltage peak. The sensing circuit 72 can also rapidly detect the over-voltage peak or an under-voltage condition. The sensing circuit 72 can detect the over-voltage peak or the under-voltage condition substantially independent of a power status of the servo motor 10 and/or the controller 22. In some embodiments, the sensing circuit 72 can detect the over-voltage peak or the under-voltage condition even if the servo motor 10 and/or the controller 22 are not running. The sensing circuit 72 can de-energize the relay contact 74 through the relay coil 76. As a result, all of the internal power supplies can be switched off almost immediately. In some embodiments, the current source 84 can charge the capacitor 78 with the limited current before the relay contact 74 is re-energized again. The sensing circuit 72 can re-energize the relay contact 74 and can re-connect all internal power supplies once no over-voltage conditions, such as over-voltage peaks, or under-voltage conditions are being detected. In some embodiments, the relay contact 74 can be re-energized once no over-voltage conditions or under-voltage conditions are being detected and the capacitor 78 is charged to the correct level. Once the relay contact 74 is re-energized, the second diode 82 and the current source 84 can be bypassed by the relay contact 74 to enable the supply of normal operating currents. For example, if welding is being performed in the vicinity of the servo motor 10 for repairs, maintenance, or equipment installation, over-voltage peaks can travel toward the servo motor 10. The load dump protection circuit 70 can help prevent possible damage to the servo motor 10 and the electronic equipment caused by the over-voltage peaks.

Figure 5:
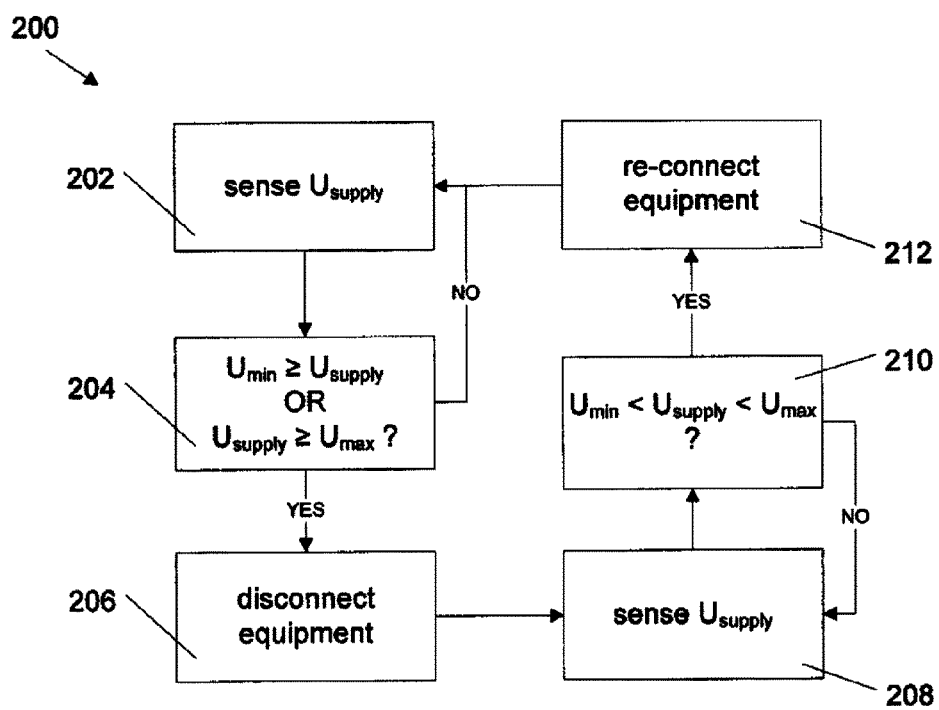
FIG. 5 is flowchart of a load dump protection method according to one embodiment of the invention.

FIG. 5 is a flow chart describing a load dump protection method 200 according to one embodiment of the invention. In some embodiments, the sensing circuit 72 can sense (at step 202) a voltage $U_{supply}$. If the voltage $U_{supply}$ is less than a maximum threshold $U_{max}$ but higher than a minimum threshold $U_{min}$ (at step 204), the sensing circuit 72 can sense (at step 202) the voltage $U_{supply}$ again. If the voltage $U_{supply}$ is higher than the maximum threshold $U_{max}$ or below the minimum threshold $U_{min}$ (at step 204), the sensing circuit 72 can disconnect (at step 206) the electronic equipment including the servo motor 10, the controller 22, and/or other electronics substantially before the over-voltage condition or the under-voltage condition can cause damage to the electronic equipment. In some embodiments, the sensing circuit 72 can disengage the relay 74 to disconnect the electronic equipment. Once disconnected, the sensing circuit 72 can continue to sense (at step 208) the voltage $U_{supply}$ substantially until the voltage $U_{supply}$ has dropped below the maximum threshold $U_{max}$ or has risen above the minimum threshold $U_{min}$ (at step 210). The sensing circuit 72 can re-connect (at step 212) the electronic equipment, before the load dump protection method 200 is restarted (at step 202). In some embodiments, the relay 74 can be re-energized in order to re-connect the electronic equipment.

Figure 6:
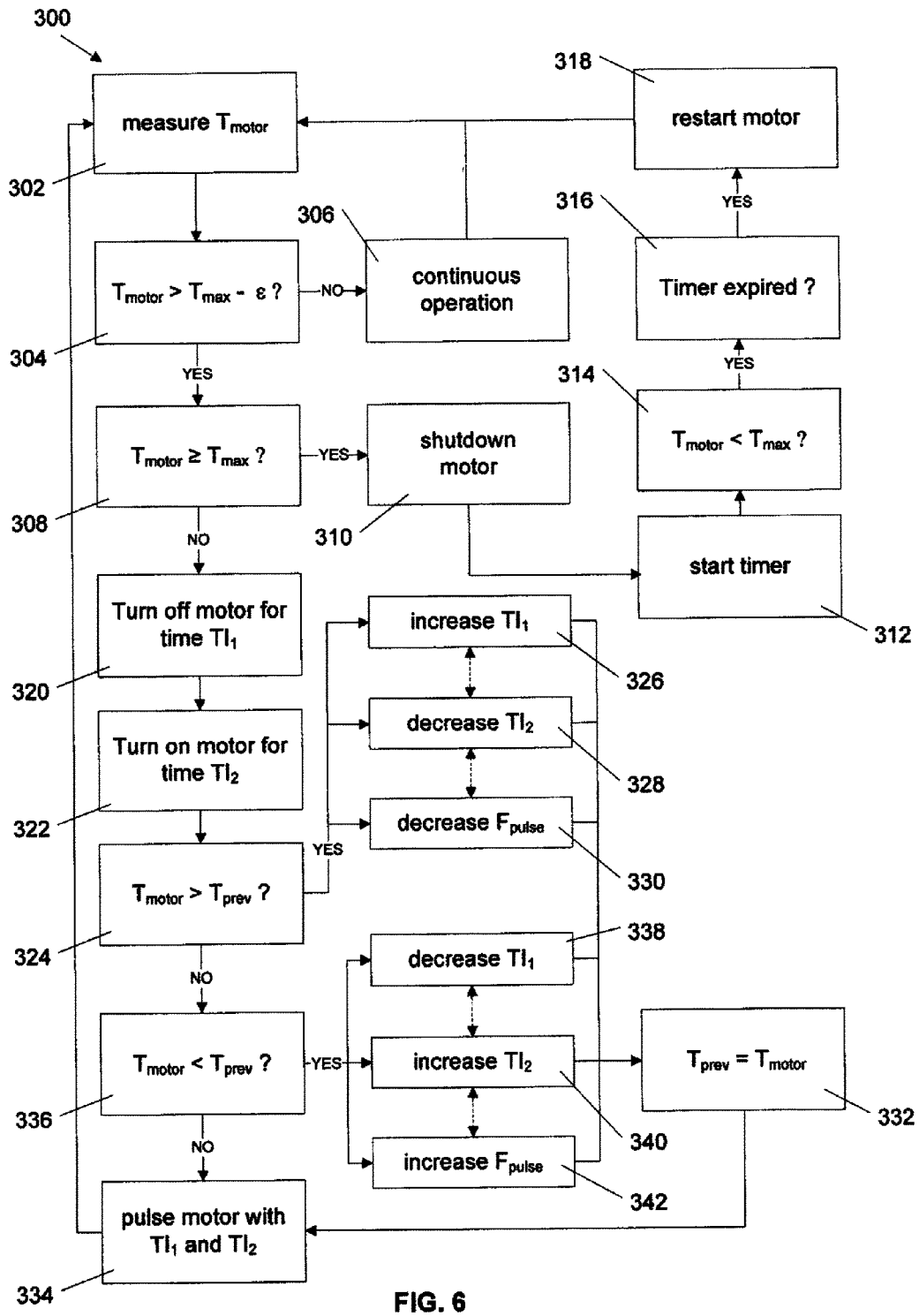
FIG. 6 is a flowchart of a power management control of the servo motor according to one embodiment of the invention.

The servo motor 10 can generates heat, especially at high RPM. The servo motor 10 can include passive heat controls, such as heat sinks, vent holes, etc. In some embodiments, as shown in FIG. 6, the servo motor 10 can use a power management control method 300 to actively prevent over-heating. In some embodiments, the duty cycle of the current supplied to the servo motor 10 can be altered to prevent over-heating.

FIG. 6 illustrates the power management control method 300 according to one embodiment of the invention. In some embodiments, the DSP 48 can measure (at step 302) a temperature ($T_{motor}$) of the servo motor 10. The DSP 48 can measure the temperature of any suitable component of the servo motor 10. In some embodiments, the DSP 48 can measure the temperature of multiple components. The DSP 48 can determine (at step 304), if the temperature $T_{motor}$ is approaching a maximum temperature $T_{max}$ (i.e., if the temperature $T_{motor}$ is within a range $\epsilon$). The maximum temperature $T_{max}$ can be stored in the memory 50, and, if multiple components of the servo motor 10 are monitored by the DSP 48, the maximum temperature $T_{max}$ can be component specific. If the maximum temperature $T_{max}$ does not approach the temperature $T_{motor}$, the controller 22 can operate (at step 306) the servo motor 10 with the external command. The DSP 48 can restart (at step 302) the power management control method 300 by measuring the temperature $T_{motor}$.

If the temperature $T_{motor}$ approaches the maximum temperature $T_{max}$, the DSP 48 can determine (step 308) whether the maximum temperature $T_{max}$ has been exceeded. If the maximum temperature $T_{max}$ has been exceeded at step 308, the servo motor 10 can be shut down (at step 310) and the DSP 48 can start a timer (at step 312). The timer can be set for a time period long enough to allow the servo motor 10 to cool. In some embodiments, the timer can be set for a time period of about one minute. After the timer has been started (at step 312), the DSP 48 can continue to monitor (at step 314) the temperature $T_{motor}$ of the servo motor 10. If the temperature $T_{motor}$ has dropped below the maximum temperature $T_{max}$ the DSP 48 can determine whether the timer has expired (at step 316). Once the timer has expired (at step 314), the DSP 48 can restart (at step 318) the servo motor 10 and can measure (at step 302) the temperature $T_{motor}$ again.

If the temperature $T_{motor}$ is below the maximum temperature $T_{max}$ but within the range ∈, the DSP 48 can shut down (at step 320) the servo motor 10 for a first time interval $TI_1$. The DSP 48 can turn on (at step 322) the servo motor 10 for a second time interval $TI_2$. In some embodiments, the first time interval $TI_1$ and/or the second time interval $TI_2$ can be a default value and/or a previously stored value in the controller 22. In some embodiments, the servo motor 10 can run continuously during the second time interval $TI_2$, while in other embodiments, the servo motor 10 can be pulsed with a certain frequency $F_{pulse}$. The temperature $T_{motor}$ can be compared (at step 324) to a previously stored temperature $T_{prev}$. In some embodiments, the temperature $T_{prev}$ can be a default value during initialization; (i.e., if no temperature has been previously stored in the memory 50 since the last power-up of the servo motor 10). If the temperature $T_{prev}$ is lower than the temperature $T_{motor}$, the DSP 48 can increase (at step 326) the first time interval $TI_1$, decrease (at step 328) the second time interval $TI_2$, and/or decrease (at step 330) the frequency $F_{pulse}$. The DSP 48 can store (at step 332) the temperature $T_{motor}$ as the temperature $T_{prev}$ in the memory 50. The DSP 48 can operate (at step 334) the servo motor 10 with the first time interval $TI_1$ and the second time interval $TI_2$ resulting in a pulsing of the servo motor 10. In some embodiments, the pulse frequency resulting from the first time interval $TI_1$ and the second time interval $TI_2$ can be substantially lower than the frequency $F_{pulse}$, at which the servo motor 10 can be operated during the second time interval $TI_2$. In some embodiments, the frequency $F_{pulse}$ can be less than about 20 kilohertz.

If the temperature $T_{motor}$ is not higher than the temperature $T_{prev}$ (at step 324), the DSP 48 can determine (at step 336) whether the temperature $T_{prev}$ is higher than the temperature $T_{motor}$. If the temperature $T_{prev}$ is higher than the temperature $T_{motor}$, the DSP 48 can decrease (at step 338) the first time interval $TI_1$, increase (at step 340) the second time interval $TI_2$, and/or increase (at step 342) the frequency $F_{pulse}$. The DSP 48 can store (at step 332) the temperature $T_{motor}$ as the temperature $T_{prev}$ in the memory 50. The DSP 48 can pulse (at step 334) the servo motor 10 with the first time interval $TI_1$ and the second time interval $TI_2$. If the temperature $T_{prev}$ is substantially equal to the temperature $T_{motor}$, the servo motor 10 can be pulsed (at step 334) with the first time interval $TI_1$ and the second time interval $TI_2$. After step 334, the DSP 48 can restart (at step 302) the power management control, method 300.

In some embodiments, the power management control method 300 can be self-adapting and can learn the optimal values for at least one of the first time interval $TI_1$, the second time interval $TI_2$, and the frequency $F_{pulse}$. As a result, the servo motor 10 can operate at high RPM over prolonged periods of time before having to shut down due to an over-temperature condition. In some embodiments, the power management control method 300 can adjust at least one of the first time interval $TI_1$, the second time interval $TI_2$, and the frequency $F_{pulse}$ over a short period of time, while maximizing a work output of the servo motor 10 under the given circumstances without exceeding the maximum temperature $T_{max}$ and/or shutting down. In some embodiments, the period of time in which the power management control method 300 can learn the optimal values for pulsing the servo motor 10 can be within about 10 rotations of the rotor shaft 26.

In some embodiments, the operation of the servo motor 10 with the frequency $F_{pulse}$ can result in power losses in the servo motor 10 itself, the controller 22, and/or the power device 68. The power losses can increase the temperature of the respective component and/or equipment. In some embodiments, the frequency $F_{pulse}$ can be used to determine a physical location of the power losses. In some embodiments, the frequency $F_{pulse}$ can be increased to reduce the power losses in the servo motor 10 in order to assist the power management control method 300 in preventing the servo motor 10 from overheating. As a result, the increase frequency $F_{pulse}$ can increase the power losses in the controller 22 and/or the power device 68. To prevent overheating of the controller 22 and/or the power device 68, the frequency $F_{pulse}$ can be decreased in order to limit the power losses. As a result, the decreased frequency $F_{pulse}$ can be used to increase the power losses in the servo motor 10.

In some embodiments, the power management control method 300 can be used to adjust the frequency $F_{pulse}$ to balance the power losses. In some embodiments, the power management control method 300 can vary the frequency $F_{pulse}$ in order to prevent overheating of the servo motor 10 and/or any other electronic equipment. In some embodiments, the power management control method 300 can determine a certain frequency $F_{pulse}$ depending on an operation point and/or condition of the servo motor 10. In some embodiments, varying the frequency $F_{pulse}$ can maximize the overall system efficiency for the operation of the servo motor 10.

Figure 7A:
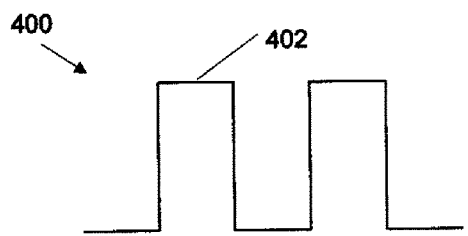
FIGS. 7A through 7D are schematic graphs of various pulse shapes according to some embodiments of the invention.
Figure 7B:
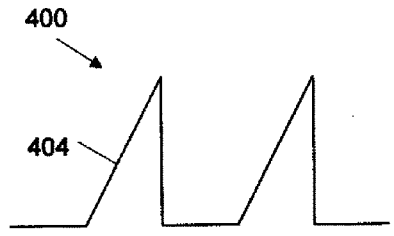
Figure 7C:
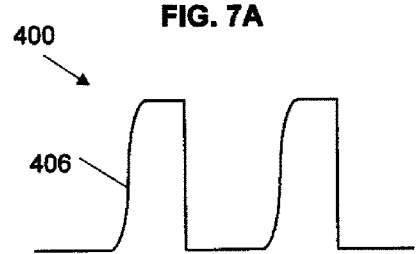
Figure 7D:
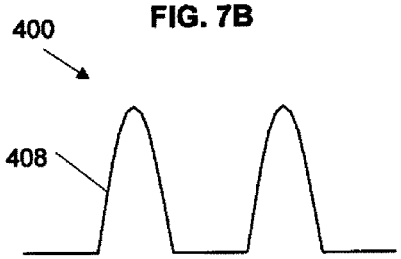

FIGS. 7A through 7D illustrate various tailored pulse shapes 400 according to some embodiments of the invention. The tailored pulse shapes 400 can include a step pulse shape 402 (FIG. 7A), a linear ramp pulse shape 404 (FIG. 7B), a polynomial pulse shape 406 (FIG. 7C), and a trigonometric pulse shape 408 (FIG. 7D). In some embodiments, a beginning and/or an end of a pulse can be tailored in order to derive the tailored pulse shapes 400. The polynomial pulse shape 406 can be approximated by any suitable higher polynomial and/or rational function. The trigonometric pulse shape 408 can be approximated by any trigonometric function including sine, cosine, tangent, hyperbolic, arc, and other exponential functions including real and/or imaginary arguments.

In some embodiments, the power management control method 300 can use the tailored pulse shapes 400. The tailored pulse shapes 400 can be adjusted to minimize the mechanical wear of the servo motor 10. In some embodiments, the tailored pulse shapes 400 can minimize mechanical stresses being transferred from the servo motor 10 onto the peripheral. The tailored pulse shapes 400 can be adjusted to optimize the amount of work output for the amount of power supplied to the servo motor 10. In some embodiments, the tailored pulse shapes 400 can be modified to lower a thermal shock of the servo motor 10. Heat generated by the servo motor 10 at a high RPM can be reduced so that the servo motor 10 can continue to operate at the high RPM over prolonged periods of time without shutting down due to an over-temperature condition and/or changing the first time interval $TI_1$, the second time interval $TI_2$, and/or the frequency $F_{pulse}$.

Figure 8:
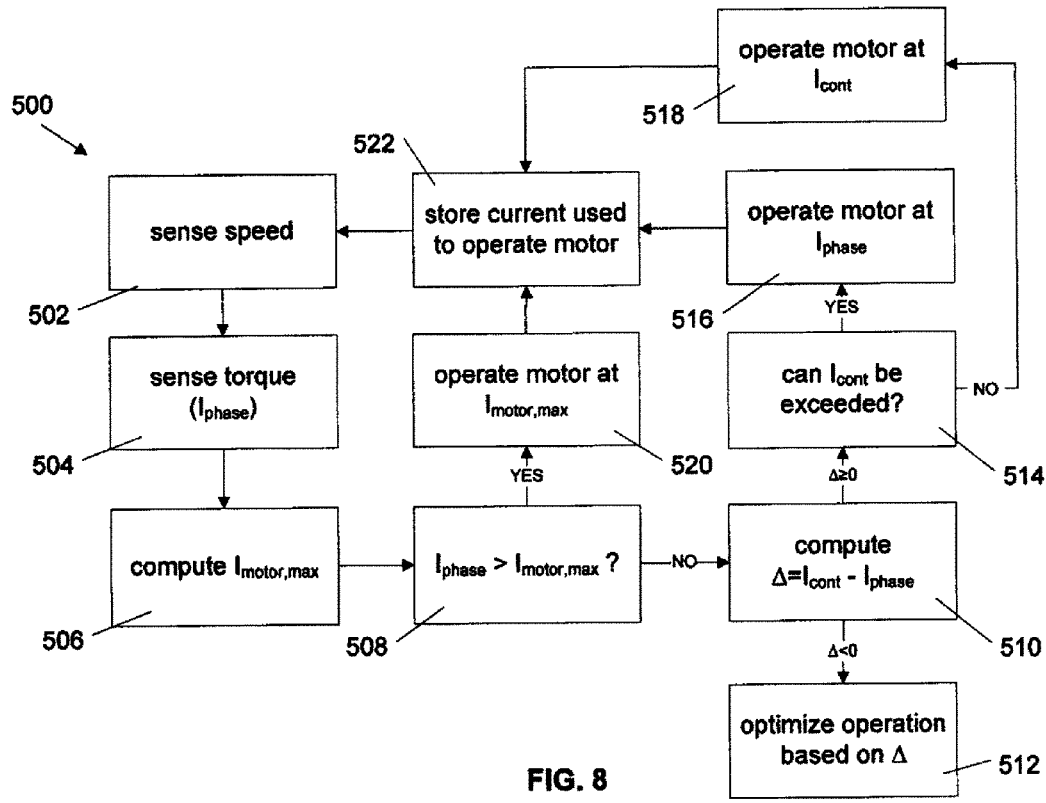
FIG. 8 is a flowchart of a current fold back protection method according to one embodiment of the invention.

FIG. 8 is a flow chart describing a current fold back protection method 500 according to some embodiments. The current fold back protection method 500 can prevent damage to the servo motor 10 from drawing a high current that would damage the servo motor 10. The current fold back protection method 500 can optimize the operation of the servo motor 10. In some embodiments, the current fold back protection method 500 can maximize the work output of the servo motor 10. The current fold back protection method 500 can be performed by the controller 22. In some embodiments, the DSP 48 can perform the current fold back protection method 500. The controller 22 can sense (at step 502) the speed of the rotor shaft 26. The controller 22 can sense (at step 504) the rotor shaft torque and/or an actual phase current $I_{phase}$ supplied to the servo motor 10. In some embodiments, the controller 22 can compute the torque of the rotor shaft 26 with the phase current $I_{phase}$. The controller 22 can compute (at step 506) a maximum motor phase current $I_{motor,max}$, which can be the highest allowable current being supplied without damaging the servo motor 10 and/or the controller 22. In some embodiments, the maximum motor phase current $I_{motor,max}$ can vary with the speed of the rotor shaft 26. In some embodiments, the controller 22 can multiply the speed of the rotor shaft 26, the torque of rotor shaft 26, and an efficiency parameter of the servo motor 10 in order to compute the maximum motor phase current $I_{motor,max}$.

If the phase current $I_{phase}$ is less than the maximum motor phase current $I_{motor,max}$ (at step 508), the controller 22 can compute (at step 510) a difference $\Delta$ between a continuous current limit $I_{cont}$ and the phase current $I_{phase}$. The continuous current limit $I_{cont}$ can be the maximum current at which the servo motor 10 can substantially continuously run without resulting in an over-temperature of the servo motor 10 and/or the controller 22. In some embodiments, the continuous current limit $I_{cont}$ can be based on an overall thermal capacity of the servo motor 10. The continuous current limit $I_{cont}$ can be stored in the memory 50.

If the continuous current limit $I_{cont}$ is larger than the phase current $I_{phase}$, the difference $\Delta$ is positive and can be used to optimize (at step 512) the operation of the servo motor 10, for example to increase the efficiency of the peripheral. If the difference $\Delta$ is negative, the controller 22 can determine (at step 514) whether the continuous current limit $I_{cont}$ can be exceeded. To determine whether the continuous current limit $I_{cont}$ can be exceeded, the controller 22 can evaluate a history of supplied currents to operate the servo motor 10 and/or the difference $\Delta$. In some embodiments, the history of supplied currents to operate the servo motor 10 can include computing a root mean square (RMS) value of the supplied current and/or squaring the supplied current and multiplying the time.

If the continuous current limit $I_{cont}$ can be exceeded, the controller 22 can operate (at step 516) the servo motor 10 with the phase current $I_{phase}$. If the continuous current limit $I_{cont}$ may not be exceeded, the controller 22 can operate (at step 518) the servo motor 10 with the continuous current limit $I_{cont}$. If the phase current $I_{phase}$ is larger than the maximum motor phase current $I_{motor,max}$ (at step 508), the servo motor 10 can be operated with the maximum motor phase current $I_{motor,max}$ (at step 520). At step 522, the controller 22 can store either one of the phase current $I_{phase}$, the continuous current limit $I_{cont}$, and the maximum motor phase current $I_{motor,max}$, which has been supplied to the servo motor 10, in the memory 50. The controller 22 can then restart the current fold back protection method 500 by sensing (at step 502) the speed of the rotor shaft 26.

If the phase current $I_{phase}$ is limited to the maximum motor phase current $I_{motor,max}$ or the continuous current limit $I_{cont}$, the servo motor 10 can be operated with the maximum motor phase current $I_{motor,max}$ (at step 520) or the continuous current limit $I_{cont}$ (at step 518). Operating the servo motor 10 at the maximum motor phase current $I_{motor,max}$ or the continuous current limit $I_{cont}$ can prevent damage to the servo motor 10. Due to the maximum motor phase current $I_{motor,max}$ and/or the continuous current limit $I_{cont}$ being lower than the current draw necessary to operate the servo motor 10, operating the servo motor 10 at the maximum motor phase current $I_{motor,max}$ or the continuous current limit $I_{cont}$ can result in a stall of the servo motor 10. The controller 22 can detect the stall of the servo motor 10. In one embodiment, the angle of the rotor shaft 26 of the servo motor 10 can be used to identify a stall condition of the servo motor 10. Other embodiments of the invention can use the speed of the rotor shaft 26 of the servo motor 10 to detect a stall condition of the servo motor 10. Once a stall condition has been detected, the servo motor 10 can attempt to operate again after a certain time interval. In some embodiments, the time interval can be about one second so that the servo motor 10 can regain operation again substantially immediately after the stall condition has been removed.

A power stage rating of the servo motor 10 and/or the controller 22 can be determined by a continuous operating current and a peak operating current. The continuous operating current can influence the heat generated by the servo motor 10 and/or the controller 22. The peak operating current can determine the power rating of the servo motor 10 and/or the controller 22. In some embodiments, the servo motor 10 can be designed to achieve a specific torque constant. Multiple parameters can influence the torque constant. In some embodiments, the torque constant can depend on the number of windings 46, the number of poles of the rotors 28, the pattern of the windings 46, the thickness of the wire used for the windings 46, the material of the wire, the material of the stator 30, and numerous other parameters. In some embodiments, the temperature of the servo motor 10 can influence the torque constant. As a result, the torque constant can vary because the temperature of the servo motor 10 can change significantly over the course of its operation. In some embodiments, the DSP 48 can include a mapping procedure to compensate for the temperature variation and the resulting change in the torque constant. As a result, the torque of the rotor shaft 26 that is necessary to drive the servo motor 10 can be accurately computed over a large range of temperatures.

The torque constant can be stored in the memory 50. In some embodiments, the torque constant can be accessed by the DSP 48. In some embodiments, the DSP 48 can compute the torque of the rotor shaft 26 that is necessary to drive the servo motor 10 based on the torque constant and the current draw of the servo motor 10. The torque constant can influence the peak operating current. A large torque constant can result in a low power stage rating of the servo motor 10. The high torque constant can reduce the peak operating current. In some embodiments, the peak operating current can be reduced from about 110 Amperes to about 90 Amperes. The heat generation during peak operation of the servo motor 10 can be reduced by increasing the torque constant. The large torque constant can lengthen a time period during which the servo motor 10 can operate at peak operating current without overheating.

In some embodiments, the servo motor 10 can be driven with high torque values down to substantially zero RPM. The high torque values can be achieved by an increased back electromotive force (BEMF) constant of the servo motor 10. In some embodiments, the BEMF constant can be proportional to the torque constant. The increased BEMF constant can reduce the current necessary to drive the servo motor 10. As a result, the servo motor 10 can achieve a certain torque of the rotor shaft 26 at the reduced current. The increased BEMF constant can reduce power losses in the controller 22 and/or other electronic equipment. In some embodiments, the BEMF constant can be related to the highest expected load the servo motor 10 is designed to be capable of moving. In some embodiments, the BEMF constant can be at least 3.5 Volts root mean square per thousand RPM (VRMS/KPRM). In some embodiments, the ratio of the BEMF constant to a voltage driving the servo motor 10 can be constant.

A high BEMF constant can reduce the maximum speed of the rotor shaft 26 at which the servo motor 10 can be driven. In some embodiments, the BEMF constant and the maximum speed of the rotor shaft 26 of the servo motor 10 can be directly proportional. For example, if the BEMF constant is doubled, the maximum speed of the rotor shaft 26 of the servo motor 10 can be halved. The BEMF constant can be a compromise between a low speed requirement, a high speed requirement, and a thermal load requirement of the servo motor 10. In some embodiments, the low speed requirement of the servo motor 10 can dictate a certain BEMF constant, which can result in the servo motor 10 not being able to fulfill the high-speed requirement in order to fulfill a specific point of operation.

In some embodiments, the servo motor 10 can use a phase angle advancing technique for the supplied power in order to increase the maximum speed of the rotor shaft 26. A commutation angle can be advanced by supplying a phase current at an angle increment before the rotor 28 passes a BEMF zero crossing firing angle. The phase angle advancing technique can retard the commutation angle by supplying the phase current at the angle increment after the at least one rotor 28 has passed the BEMF zero crossing firing angle. In some embodiments, the phase angle advancing technique can influence the BEMF constant. In some embodiments, advancing the commutation angle can decrease the BEMF constant. The servo motor 10 can be optimized to a certain point of operation. The angle increment of the phase angle advancing technique can be related to the speed of the rotor shaft 26. In one embodiment, the angle increment can be about +/−45 electrical degrees.

In some embodiments, the servo motor 10 can be used to drive a pump. Driving the pump without the phase angle advancing technique can result in a flow rate of 4 gallons per minute (GPM) at a pressure of 150 pounds per square inch (PSI). In one embodiment, the phase angle advancing technique can increase the flow rate to about 5 GPM, which can be delivered at the pressure of 150 PSI.

In some embodiments, the servo motor 10 can be operated with a direct current (DC) power supply (e.g., a battery of a vehicle). In other embodiments, the servo motor 10 can be operated with an alternating current (AC) power supply (e.g., a generator or alternator of a vehicle or a mains power supply in a building).

In some embodiments, the servo motor 10 can be powered with different voltages. The voltages can include one or more of 12 Volts, 24 Volts, 48 Volts, 120 Volts, and 240 Volts. The stator windings 46 can be adapted to a specific voltage. The stator windings 46 can be adapted so that the servo motor 10 can operate with more than one power source (e.g., with a DC power supply or an AC power supply). Other embodiments can include different input power stages that allow the servo motor 10 to selectively operate with different voltages and/or power sources. For example, if the servo motor 10 is used for a sprinkler system in a building, the servo motor 10 can be driven by the 120 Volts AC mains power supply. If mains power is lost, the controller 22 can automatically switch to a 12 Volts DC battery power supply to continue the operation of the sprinkler system.

Figure 9:
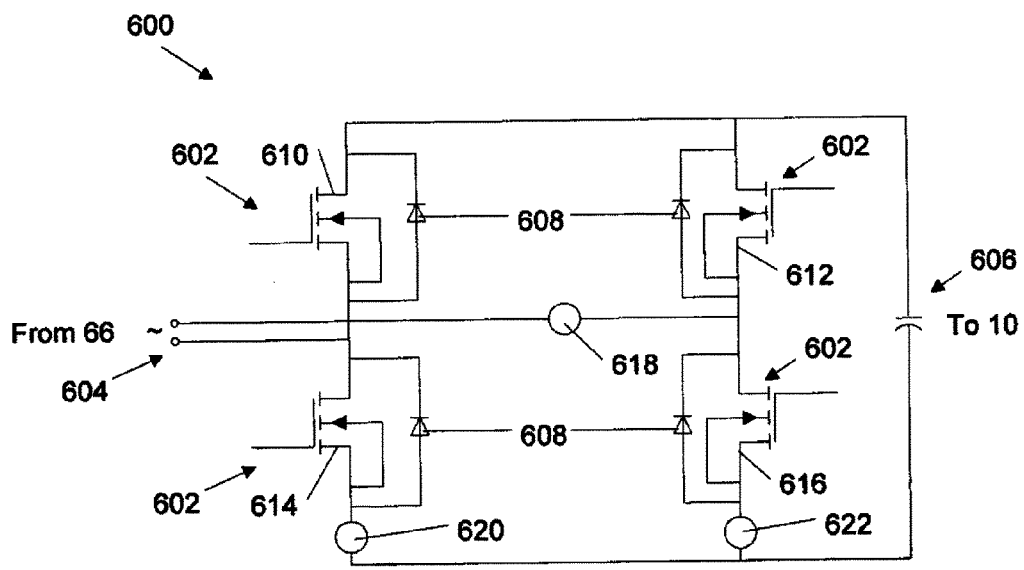
FIG. 9 is a schematic block diagram of a rectification bridge according to one embodiment of the invention.

FIG. 9 illustrates a rectification bridge 600 according to one embodiment of the invention. The rectification bridge 600 can be used to operate the servo motor 10 with an AC power supply. The rectification bridge 600 can include two or more transistors 602, an AC bus 604, and a DC bus 606. The AC bus 604 can connect to the external power supply 66. The DC bus 606 can be used to supply power to the servo motor 10. The transistors 602 can each include an intrinsic diode 608. In some embodiments, the transistors 602 can include metal oxide semiconductor field effect transistors (MOSFETs). In some embodiments, the transistors 602 can be N-type MOSFETs, while in other embodiments, the two transistors 602 can be P-type MOSFETs. In some embodiments, the transistors 602 can include a first transistor 610, a second transistor 612, a third transistor 614, and a fourth transistor 616 configured in an H-bridge.

In some embodiments, the controller 22 can sense an incoming current $I_{AC}$ at a first location 618 on the AC bus 604. In other embodiments, the controller 10 can sense the incoming current $I_{AC}$ at a second location 620 along with a third location 622 of the rectification bridge 600. Sensing the incoming current $I_{AC}$ of the rectification bridge 600 can result in a much higher level of electrical noise immunity instead of, for example, sensing voltages. If the incoming current $I_{AC}$ is below a threshold current $I_{limit}$, the intrinsic diodes 608 can be used to rectify the incoming current $I_{AC}$. If the incoming current $I_{AC}$ is above the threshold current $I_{limit}$, the transistors 602 can be used to rectify the incoming current $I_{AC}$. To rectify the incoming current $I_{AC}$, the transistors 602 can be turned on by control signals from the controller 22. The rectification bridge 600 can provide the correct timing for the switching of the transistors 602. In some embodiments, the control current can prevent a discharge of the DC bus 606 and/or a shortening of the AC bus 604.

In some embodiments, a voltage drop across the transistors 602 can be lower than a voltage drop across the intrinsic diodes 608. As a result, the switching of the transistors 602 can limit the power losses of the rectification bridge 600, if the incoming current $I_{AC}$ exceeds the threshold current $I_{limit}$. In some embodiments, the threshold current $I_{limit}$ can be low enough to prevent the rectification bridge 600 from overheating due to the power losses of the intrinsic diodes 608, but high enough to provide substantial immunity to interference and noise on the AC bus 604. The rectification bridge 600 can have much lower power losses than a conventional rectification bridge including diodes only. As a result, the use of the rectification bridge 600 can enable a higher efficiency and an operation in higher ambient temperatures. In some embodiments, the rectification bridge 600 can limit the power losses to about 30 Watts at an ambient temperature of about 70° C. (160° F.). In some embodiments, the threshold current $I_{limit}$ can include hysteresis to increase an immunity to the noise on the AC bus 604.

Figure 10:
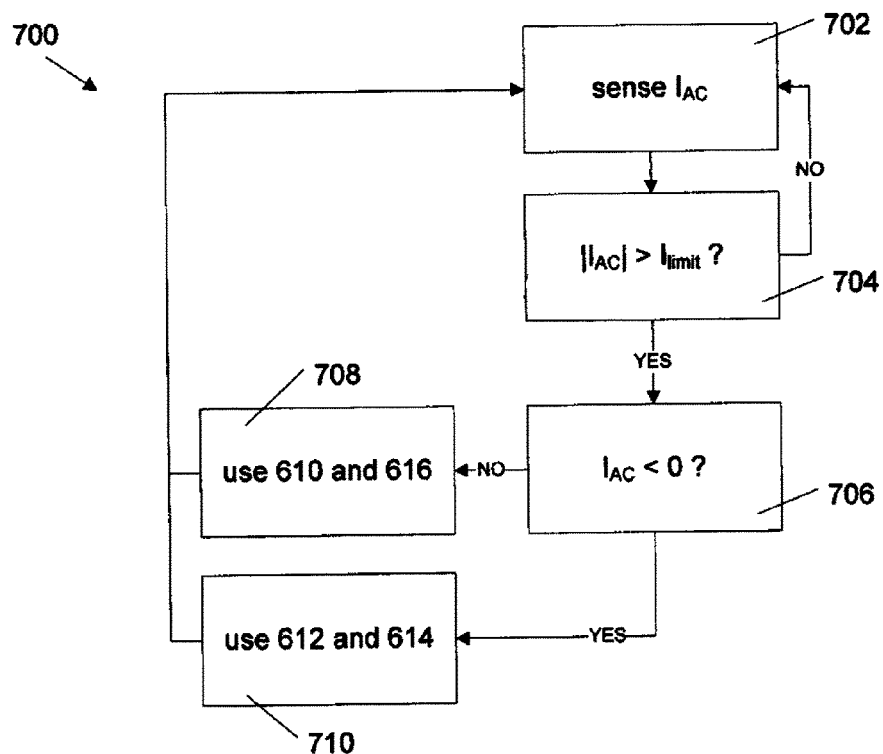
FIG. 10 is a flow chart of an operation of the rectification bridge of FIG. 9.

FIG. 10 illustrates a rectification method 700 according to one embodiment of the invention. The incoming current $I_{AC}$ can be sensed (at step 702). If the absolute value of the incoming current $I_{AC}$ is below the current threshold $I_{limit}$ (at step 704), the intrinsic diodes 608 can rectify the incoming current $I_{AC}$ and the rectification method 700 can be restarted (at step 702) with sensing the incoming current $I_{AC}$. If the absolute value of the incoming current $I_{AC}$ is above the current threshold $I_{limit}$ (at step 704), the controller 22 can determine (at step 706) whether the incoming current $I_{AC}$ is negative. If the incoming current $I_{AC}$ is positive, the controller 22 can supply (at step 708) the control current to the transistors 602. In some embodiments, the controller 22 can use the first transistor 610 and the fourth transistor 616, which can be positioned diagonally across from one another in the rectification bridge 600. If the incoming current $I_{AC}$ is negative, the controller 22 can supply (at step 710) the control current to the transistors 602. In some embodiments, the controller 22 can use the second transistor 612 and the third transistor 614, which can be positioned diagonally across from one another in the rectification bridge 600. After step 708 and/or step 710, the rectification method 700 can be restarted by sensing the incoming current $I_{AC}$ so that the intrinsic diodes 608 can be substantially immediately used for the rectification, if the incoming current $I_{AC}$ drops below the current threshold $I_{limit}$.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

The invention claimed is:

1. A method of controlling a motor, the method comprising:
monitoring a current temperature of the motor and a power stage of the motor substantially continuously and substantially in real-time;
determining whether the current temperature of the motor approaches a maximum rated temperature of the motor;
removing power from the motor for a first time interval;
supplying power to the motor for a second time interval after the first time interval has elapsed;
determining that the current temperature of the motor is decreasing and at least one of decreasing the first time interval and increasing the second time interval until the current temperature starts increasing;
determining that the current temperature of the motor is increasing and at least one of increasing the first time interval and decreasing the second time interval until the current temperature starts decreasing; and
determining optimum settings for the first time interval and the second time interval in order to deliver maximum output while remaining below the maximum rated temperature of the motor.

2. The method of claim 1, wherein the power being supplied to the motor during the second time interval is being pulsed.

3. The method of claim 2, wherein a frequency of the pulsed power being supplied to the motor is varied based on the current temperature of at least one of the motor and the power stage.

4. The method of claim 3, wherein the frequency of the pulsed power being supplied to the motor is decreased in order to reduce the current temperature of the power stage.

5. The method of claim 3, wherein the frequency of the pulsed power being supplied to the motor is increased in order to reduce the current temperature of the motor.

6. The method of claim 3, wherein the frequency of the pulsed power being supplied to the motor is less than about 20 kilohertz.

7. The method of claim 1, wherein the motor is a servo motor.

8. The method of claim 1, wherein the motor is a permanent magnet brushless motor.

9. A method of controlling a motor, the method comprising:
monitoring a current temperature of the motor and a power stage of the motor substantially continuously and substantially in real-time;
determining whether the current temperature approaches a maximum rated temperature of the motor;
removing power from the motor for a first time interval;
pulsing power to the motor for a second time interval after the first time interval has elapsed;
tailoring pulse shapes of the power provided to the motor for the second time interval.

10. The method of claim 9, wherein the tailored pulse shapes include at least one of a step, a linear shape, a polynomial shape, and a trigonometric shape.

11. The method of claim 9, wherein the tailored pulse shapes at least one of minimize mechanical wear on the motor, minimize thermal shock, optimize work output for applied power, and reduce heating for work output.

12. The method of claim 9, and further comprising determining that the current temperature is decreasing and decreasing the first time interval and/or increasing the second time interval until the current temperature starts increasing.

13. The method of claim 9, and further comprising determining that the current temperature is increasing and increasing the first time interval and/or decreasing the second time interval until the current temperature starts decreasing.

14. The method of claim 9, and further comprising determining optimum settings for the first time period and the second time period in order to deliver maximum output while remaining below the maximum rated temperature of the motor.

15. The method of claim 9, wherein the motor is a servo motor.

16. The method of claim 9, wherein the motor is a permanent magnet brushless motor.

* * * * *